(12) United States Patent
Marwah et al.

(10) Patent No.: US 8,836,536 B2
(45) Date of Patent: Sep. 16, 2014

(54) DEVICE CHARACTERIZATION SYSTEM AND METHODS

(75) Inventors: Manish Marwah, Palo Alto, CA (US); Chandrakant Patel, Fremont, CA (US); Geoff M. Lyon, Half Moon Bay, CA (US); Martha L. Lyons, Sunnyvale, CA (US); Martin Arlitt, Calgary (CA); Cullen E. Bash, Los Gatos, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 670 days.

(21) Appl. No.: 13/194,161

(22) Filed: Jul. 29, 2011

(65) Prior Publication Data
US 2013/0027220 A1    Jan. 31, 2013

(51) Int. Cl.
*G08B 21/00* (2006.01)
*H04Q 9/00* (2006.01)

(52) U.S. Cl.
CPC ........... *H04Q 9/00* (2013.01); *H04Q 2209/845* (2013.01)
USPC ................................. 340/870.16; 340/870.01

(58) Field of Classification Search
USPC ............................ 340/870.16, 870.01, 870.17
See application file for complete search history.

(56) References Cited

U.S. PATENT DOCUMENTS

| 7,403,869 B2 * | 7/2008 | Wegerich et al. ............. 702/183 |
| 2007/0294768 A1 | 12/2007 | Moskovitch et al. |
| 2008/0133439 A1 | 6/2008 | Ikeda |
| 2009/0164811 A1 | 6/2009 | Sharma et al. |

FOREIGN PATENT DOCUMENTS

EP    1022632    7/2000

OTHER PUBLICATIONS

V. Jakkula et al: Anomaly Detection Using Temporal Data Mining in a Smart Home Environment; Wahington State University; Pullman, WA; pp. 1-12, 2009.
Yuki Ohno et al; Anomaly Detection System Using Resource Pattern Learning; http://portal.acm.org/citation.cfm?id=1525217#IndexTerms > Publication Date: 2009; on pp. 38-42.

* cited by examiner

*Primary Examiner* — Travis Hunnings

(57) ABSTRACT

In an embodiment, a device characterization system includes a sensor to sense an attribute of a device, a processor, and an algorithm executable on the processor to collect time series data of the attribute from the sensor, detect edges in the data, identify clusters from the edges, label the clusters based on input from a supervisor, and estimate device characterization parameters from the clusters.

16 Claims, 6 Drawing Sheets

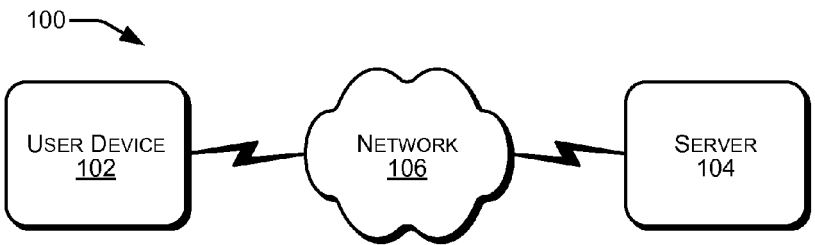
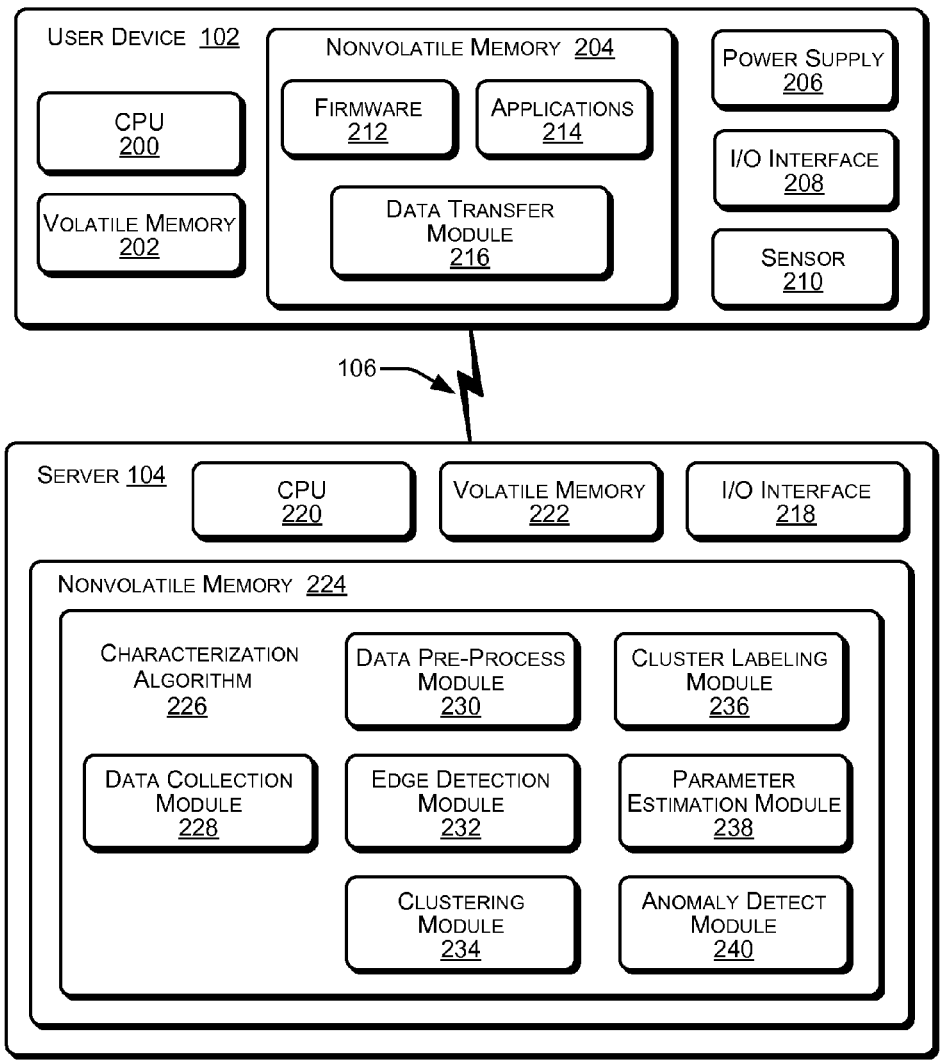

DEVICE CHARACTERIZATION SYSTEM AND METHODS

BACKGROUND

Appliances or devices such as refrigerators have temporally varying power consumption behavior. For example, a refrigerator compressor turns ON/OFF periodically based on the degree of cooling required. This behavior directly impacts the amount of energy consumed by the device. Therefore, increased power consumption can result from various anomalies that cause deviations in normal operation of the appliance.

BRIEF DESCRIPTION OF THE DRAWINGS

The present embodiments will now be described, by way of example, with reference to the accompanying drawings, in which:

FIG. 1 shows an exemplary environment suitable for implementing a device characterization system and methods as disclosed herein, according to an embodiment;

FIG. 2 shows the exemplary environment for implementing a device characterization system and methods with the user device and server illustrated in detail, according to an embodiment;

DETAILED DESCRIPTION

Overview of Problem and Solution

Figure 3:
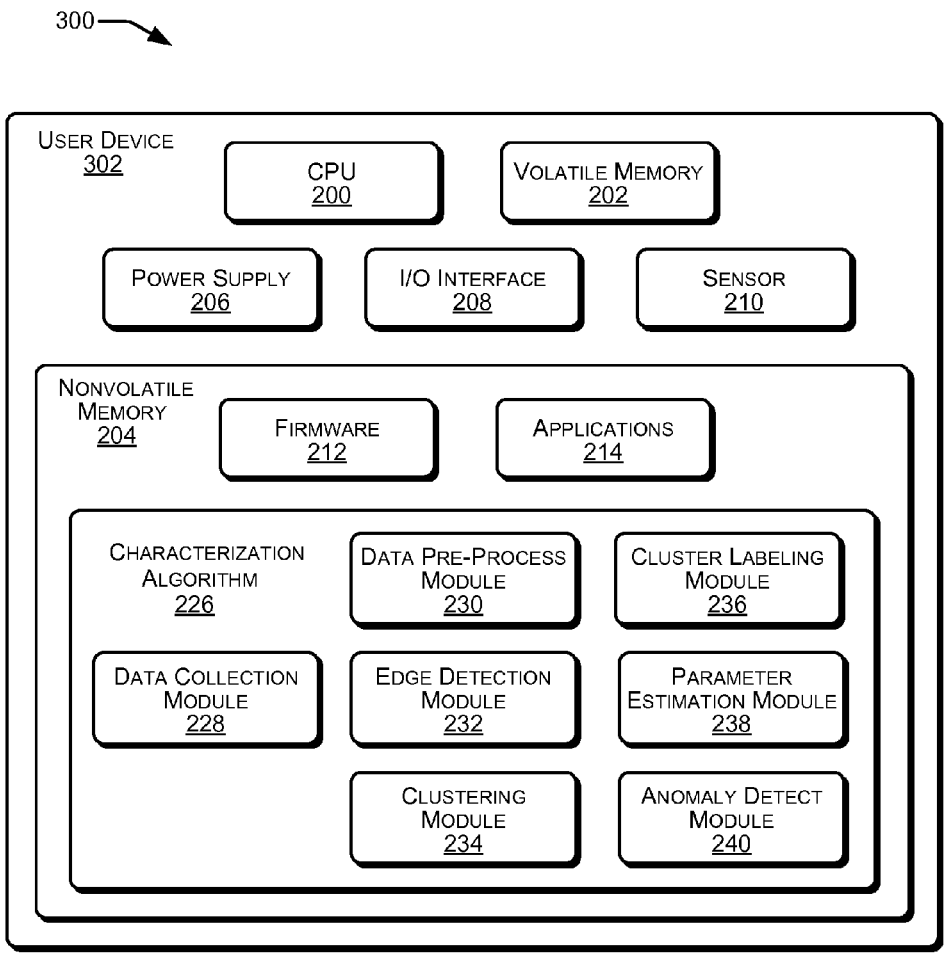
FIG. 3 shows another exemplary environment suitable for implementing a device characterization system and methods as disclosed herein, according to an embodiment.

As noted above, the power consumption behavior of an appliance/device ("appliance" and "device" are used interchangeably throughout) such as a refrigerator varies temporally. However, various anomalies can cause deviations in the normal operation of a device that result in an increased power consumption. In addition, certain anomalous behavior may manifest as unique changes in particular operational characteristics.

Because the abnormal behavior of a device often does not result in a noticeable degradation of the device's performance, the behavior is difficult to detect using existing instrumentation, software and/or firmware generally installed in the device for detecting failures or abnormal conditions. However, such abnormal behavior typically results in an increase in energy consumption of the device. Prior solutions for detecting abnormal behavior in devices focus on device performance, but overlook attributes related to the power consumption of the device. In addition, prior solutions usually involve considerable domain-specific knowledge (i.e., knowledge of the specific device).

Embodiments of the present disclosure include a system and methodology that improve on prior methods of detecting abnormal behavior in devices, generally by employing a semi-supervised, iterative algorithm to characterize the normal operational behavior of a device. The algorithm enables a characterization of the temporal behavior of the power time series of devices, which can then be used for determining deviance from normal behavior and for detecting underlying causal anomalies. The algorithm clusters events and/or states present in the time series data and estimates from the clustered events/states, parameters that characterize the time series data. In addition to facilitating the detection of deviance from normal behavior, the characterization parameters can be used for training models to detect anomalies using machine learning algorithms. The embodiments additionally include the capacity for alerting the user of a device about a deviance from normal behavior, and for providing a label with the alert. The label gives a short description that indicates the likely occurrence of a particular anomaly that is causing a specific attribute within the appliance to not work correctly.

In one embodiment, a method of characterizing temporal behavior of a device includes collecting time series data for an attribute of the device. The method includes pre-processing the time series data to remove invalid values and fill in missing values, and then detecting edges in the time series data. Groups of similar edges are arranged into clusters. Label input is received from a supervisor and each cluster is labeled as being associated with a physical event of the device based on the label input. Based on the clusters, characterization parameters are estimated that characterize normal operation of the device.

In another embodiment, a method of characterizing temporal behavior of a device includes collecting time series data for an attribute of the device, detecting edges in the time series data, arranging groups of similar edges into a number of clusters, receiving a different number of clusters from a supervisor, arranging the groups of similar edges into the different number of clusters, labeling each cluster with a label received from the supervisor, and estimating characterization parameters from the clusters that characterize normal operation of the device.

In another embodiment, a device characterization system includes a sensor to sense an attribute of a device, a processor, and a semi-supervised, characterization algorithm executable on the processor to collect time series data of the attribute from the sensor, detect edges in the data, identify clusters from the edges, label the clusters based on input from a supervisor, and estimate device characterization parameters from the clusters.

Illustrative Embodiments

FIG. 1 shows an exemplary environment 100 suitable for implementing a device characterization system and methods as disclosed herein, according to an embodiment of the disclosure. Environment 100 includes user device 102 coupled to a server 104 through a network 106. Network 106 is intended to represent any of a variety of conventional network topologies and types (including optical, wired and/or wireless networks), employing any of a variety of conventional network protocols (including public and/or proprietary protocols). Network 106 may include, for example, a home network, a corporate network, or the Internet, as well as one or more local area networks (LANs) and/or wide area networks (WANs) and combinations thereof.

FIG. 2 shows the exemplary environment 100 for implementing a device characterization system and methods with the user device 102 and server 104 illustrated in greater detail, according to an embodiment of the disclosure. User device 102 may be implemented as any of a variety of appliances or devices that exhibit a periodic behavior such as periodic change between two finite power states. For example, user device 102 may be implemented as a refrigerator that exhibits a temporally varying power consumption behavior. The compressor in a refrigerator turns ON and OFF periodically based on an expected degree of cooling. This behavior directly impacts the amount of energy consumed by the device.

As shown in FIG. 2, in one embodiment user device 102 includes a processor (CPU) 200, volatile memory 202 (i.e., RAM), and nonvolatile memory 204 (e.g., ROM, flash memory, hard disk, floppy disk, CD-ROM, etc.). User device 102 also includes a power supply 206, an I/O interface 208 (e.g., touch screen, keyboard, etc.), and a sensor 210. I/O interface 208 may vary based on the type of device, but typically includes a touch sensitive screen, keyboard, or the like. Sensor 210 likewise may vary depending on the type of device as well as the nature of device characterization being implemented. Sensor 210 measures the value of an attribute of device 102, such as a voltage or current. Thus, a typical example of a sensor 210 is a voltage meter or a current meter used to measure power consumption of the device 102. Nonvolatile memory 204 generally provides storage of computer/processor-readable instructions, data structures, program modules and other data for user device 102. User device 102 may implement firmware 212 and/or various software application programs 214 stored in nonvolatile memory 204 or volatile memory 202 and executable on processor 200 to control the operation of device 102 and perform transactions with server 104 via network 106. In one implementation, for example, device 102 implements a data transfer module 216 to enable the transfer of power consumption data from sensor 210 on device 102 to a remote characterization algorithm 226 executing on server 104. Data transfer module 216 additionally enables the transfer of a labeled alert from the algorithm on server 104 to device 102, communicated via I/O interface 208 (e.g., displayed on a screen) to inform a device user of a detected deviation in the normal behavior of the device and a particular event or anomaly in the device related to the deviation.

Server 104 is also illustrated in greater detail in FIG. 2. In one embodiment server 104 generally comprises an arrangement of computer hardware and software configured to provide services to clients such as user device 102. Services provided by a server 104 vary widely and may include, for example, email services, news services, entertainment media services, credit card services, banking services, investment services, and the like. In the present embodiment, however, server 104 provides a device characterization service to a device 102 through the implementation of a characterization algorithm 226. Server 104 may be implemented as any of a variety of conventional computing devices, including, for example, a desktop PC, a notebook or portable computer, a workstation, a mainframe computer, an Internet appliance, combinations thereof, and so on. Server 104 may include various input/output devices 218 such as a keyboard, a mouse, and a monitor. Server 104 also generally includes a processor (CPU) 220, a volatile memory 222 (i.e., RAM), and a nonvolatile memory 224 (e.g., ROM, flash memory, hard disk, floppy disk, CD-ROM, etc.). Nonvolatile memory 224 generally provides storage of computer/processor-readable instructions, data structures, program modules and other data for server 104. Server 104 may implement various application programs (not shown) stored in nonvolatile memory 224 or volatile memory 222 and executable on processor 220 to perform transactions with user device 102.

In one implementation of server 104 as shown in FIG. 2, nonvolatile memory 224 includes characterization algorithm 226 having various program modules 228, 230, 232, 234, 236, 238 and 240. The characterization algorithm 226 executes on processor 220, in general, to receive time series data from device 102, characterize the normal behavior of device 102 based on the data, detect when device 102 exhibits abnormal behavior, and alert a user of device 102 to abnormal device behavior. More specifically, data collection module 228 collects one or more time series data at an appropriate sampling rate from device 102. The time series data collected is from one or more attributes sensed on device 102, such as a voltage level, a current flow, a power consumption, or any periodic event exhibiting a measurable finite state. The sampling rate depends on the type of device 102 and the attribute of interest on the device 102. For example, for a refrigerator device 102 where the attribute of interest is power consumption level that varies between two finite states, a sampling rate on the order of 1 to 10 seconds may be appropriate.

The data pre-processing module 230 within algorithm 226 checks the raw time series data for invalid values, out of range values, or other problems with the raw time series data. Where multiple time series have been sampled, data pre-processing module 230 synchronizes all the time series to one another. The data pre-processing module 230 fills in missing values in the data and makes the time intervals between sample readings uniform (e.g., through linear interpolation, etc.). In some implementations the data pre-processing module 230 may pass the time series data through an appropriate filter, such as a median filter for example, to remove outliers and noise, while retaining the basic form of the time series.

The edge detection module 232 generally attempts to locate changes that occur in the time series data. In one implementation, edge detection can be performed through computing differences between a sensor reading at a time t and at a time t−1. This provides a time series of all the deltas in successive time points of the quantities measured. Successive deltas in the same direction can be consolidated to obtain the magnitude of the edge.

The clustering module 234 arranges groups of similar edges into clusters. The deltas obtained with the edge detection module 232 are clustered using a suitable clustering algorithm such as k-means. The number of clusters, which is an input provided to most clustering algorithms, can be determined using domain information, or through one of many techniques discussed in clustering literature such as silhouette coefficients, looking at within-clusters and between-clusters sum-of-square distances, and so on.

The cluster labeling module 236 labels each cluster as being associated with a physical event of the device 102. The labels are input to the algorithm 226 by a human domain expert supervisor who analyzes the clusters and associates each cluster with an event occurring on the device 102. For example, the supervisor may determine from a cluster of rising edges that the cluster corresponds to the event of a compressor turning on in a refrigerator device. Therefore, the supervisor will provide a label for the rising edge cluster and input the label and the association of the label with the cluster into the algorithm 226. In another example, the supervisor may determine from a cluster of different edges that the cluster corresponds to noise, and would similarly provide a label for the cluster that indicates the appropriate association for the algorithm 226.

In another implementation, the supervisor determines through observation that the number of clusters determined by the clustering module 234 is incorrect. This can happen, for example, when a clustering algorithm arranges groups of edges into clusters that the supervisor can see do not represent distinct events amenable to individual labeling. Accordingly, the supervisor determines a different number of clusters and inputs the different number of clusters back into the clustering algorithm so that the clustering module 234 can rearrange the groups of similar edges into the different number of clusters.

The parameter estimation module 238 uses the clusters to estimate parameters that characterize the normal operation of the device 102. In one implementation, these characterization parameters can be computed through density estimation using mixture models. For instance, in the example of a refrigerator device, the ON/OFF compressor cycle frequency distribution can be estimated by fitting a probability density function to the intervals of the ON/OFF events. Similarly, the distribution of ON/OFF times of the compressor can be estimated. The characterization parameters provide a model that characterizes the normal behavior of the device 102 with respect to the attribute sampled by sensor 210.

Once the characterization parameters have been estimated, the anomaly detection module 240 detects anomalous behavior in the device 102 (i.e., behavior that deviates from the normal behavior) through continued monitoring of the attribute on the device 102. If the probability that a particular interval of the observed attribute is too low by comparison with the model provided by the characterization parameters, then the anomaly detection module 240 will provide an alert that an anomaly has occurred on the device causing the device to operate outside of its normal operating behavior. The anomaly detection module 240 will also provide the appropriate label associated with the clustered event to indicate a physical event of the device that is likely to be related to the abnormal operation of the device.

FIG. 3 shows another exemplary environment 300 suitable for implementing a device characterization system and methods as disclosed herein, according to an embodiment of the disclosure. In this embodiment, environment 300 is a device 302 as generally described above with respect to the device 102 of FIGS. 1 and 2. The main difference is that device 302 of FIG. 3 incorporates and implements the characterization algorithm 226 on its own, without interaction from a server. Accordingly, device 302 includes a processor (CPU) 200, volatile memory 202, nonvolatile memory 204, power supply 206, an I/O interface 208, and a sensor 210, as described above. In addition, nonvolatile memory 204 of device 302 includes characterization algorithm 226 having the various program modules 228, 230, 232, 234, 236, 238 and 240, for gathering time series data from device 302, characterizing the normal behavior of the device 302 based on the data, detect when the device 302 exhibits abnormal behavior, and alerting a user of device 302 to abnormal device behavior.

Thus, the component modules of characterization algorithm 226 in the FIG. 3 embodiment function in a manner similar to that discussed above regarding the FIG. 2 embodiment. Accordingly, data collection module 228 collects one or more time series data at an appropriate sampling rate from device 302, and data pre-processing module 230 synchronizes multiple time series and removes noise and invalid, out of range, and outlying data values. Likewise, edge detection module 232 locates changes that occur in the time series data, and clustering module 234 arranges groups of similar edges into clusters. Cluster labeling module 236 labels each cluster as being associated with a physical event of the device 302. In the FIG. 3 embodiment, however, the labels are input to the algorithm 226 by a domain expert supervisor located at the device 302 (e.g., via I/O interface 208), instead of at a server 104. The supervisor in this case may be the device user. The supervisor may also determine through observation that the number of clusters determined by the clustering module 234 is incorrect, and therefore input a different number of clusters back into the clustering algorithm so that the clustering module 234 can rearrange the groups of similar edges into the different number of clusters. The parameter estimating module 238 uses the clusters to estimate parameters that characterize the normal operation of the device 302, and the anomaly detection module 240 detects anomalous behavior in the device 302 through continued monitoring of the attribute on the device 302, and provides an alert with an appropriate label (e.g., via I/O interface 208) to inform the device user of a physical event that is likely to be related to the abnormal operation of the device.

Figure 4:
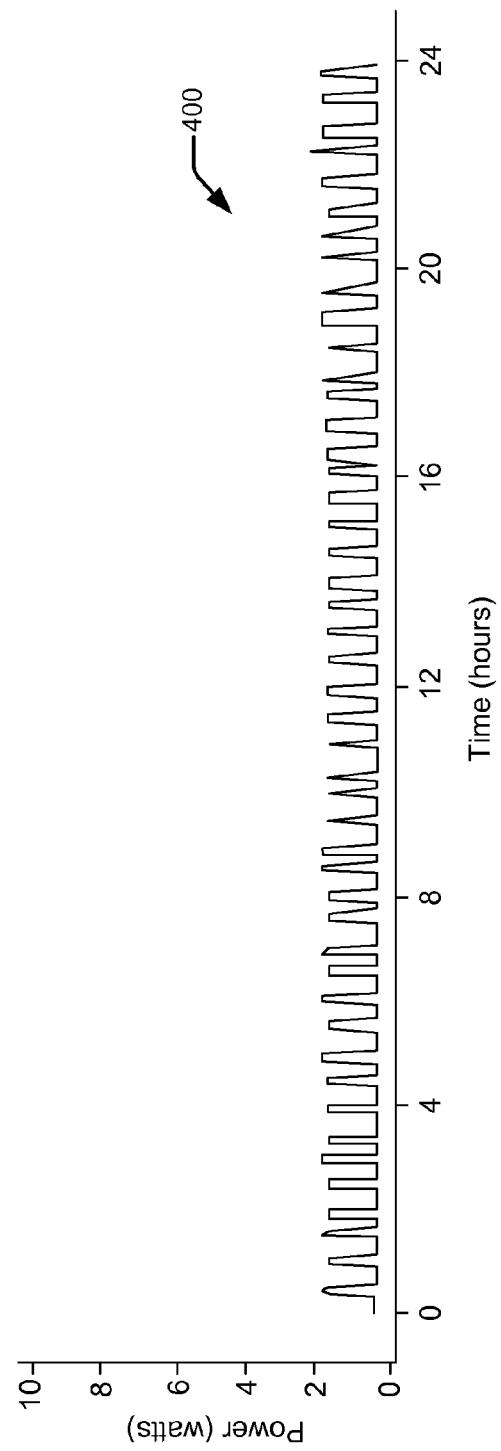
FIG. 4 shows a power consumption waveform of a refrigerator device in an example usage case, according to an embodiment.

FIG. 4 illustrates an example usage case, and shows a power consumption waveform 400 of a refrigerator device that is collected using a power meter as a sensor 210, according to an embodiment of the disclosure. The time series data in the waveform is gathered over a 24 hour period, and the data is continually varying depending on the state of the compressor. Rising edges in the waveform 400 indicate where the compressor turns on, while falling edges indicate where the compressor turns off. In this particular usage case, the characterization steps described above in characterization algorithm 226 will probabilistically define the properties of this time series such as 1) the height of the pulses, 2) the width of the pulses, 3) the distance between pulses, and so on. Note that these properties are estimated from data as probability distributions, which then characterize the normal operation of the refrigerator device.

Figure 5:
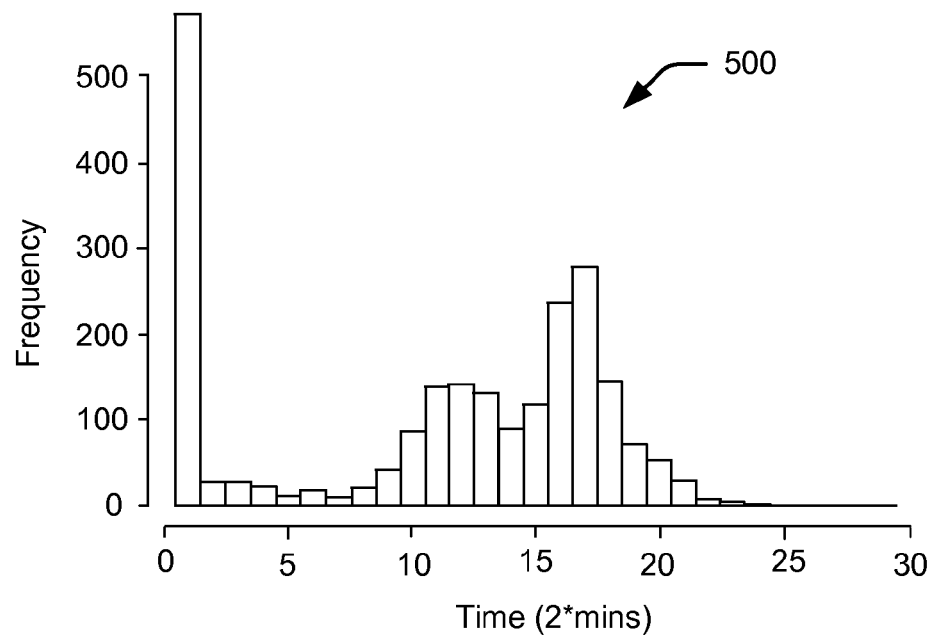
FIG. 5 shows a density function for the time difference between the beginning of successive pulses in the power consumption waveform data of FIG. 4, according to an embodiment.

FIG. 5 shows the density function 500 for the time difference between the beginning of successive pulses in the data of FIG. 4, according to an embodiment of the disclosure. Threshold-based, clustering-based, and other techniques can be used to compare the characterized normal operation of the refrigerator at any time with ongoing operation to detect anomalies. Some examples of these anomalies in this particular case include, degradation of one or more components of the refrigerator (e.g. compressor, condenser, etc.), user-related unusual or abnormal use of the refrigerator (e.g., the door of the refrigerator being left open, the seal of the door no longer functioning properly, etc.), the heat exchanger at the back of the refrigerator being covered or blocked so it is unable to dissipate an appropriate amount of heat, and so on.

Figure 6:
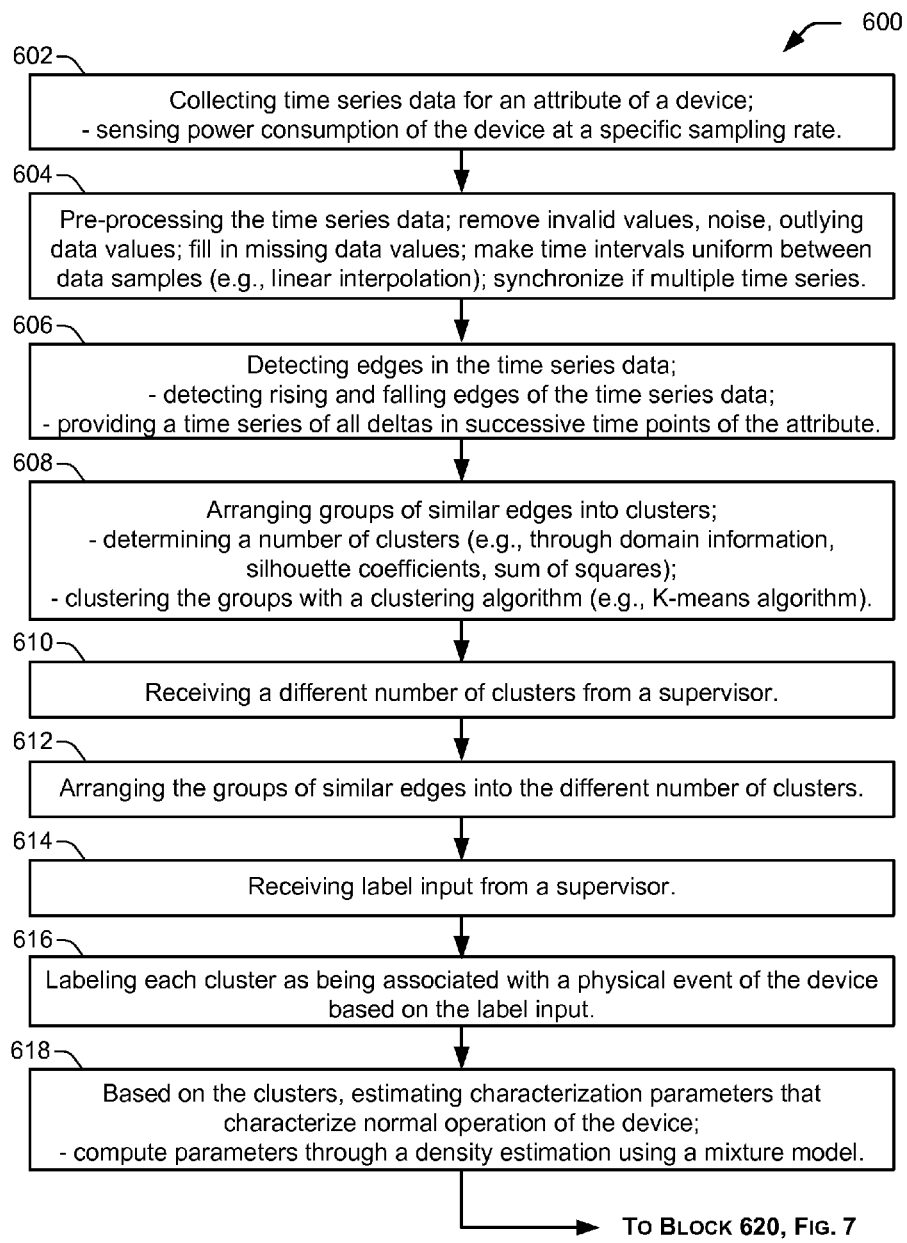
FIGS. 6 and 7 show a flowchart of an example method of characterizing temporal behavior of a device, according to an embodiment.
Figure 7:
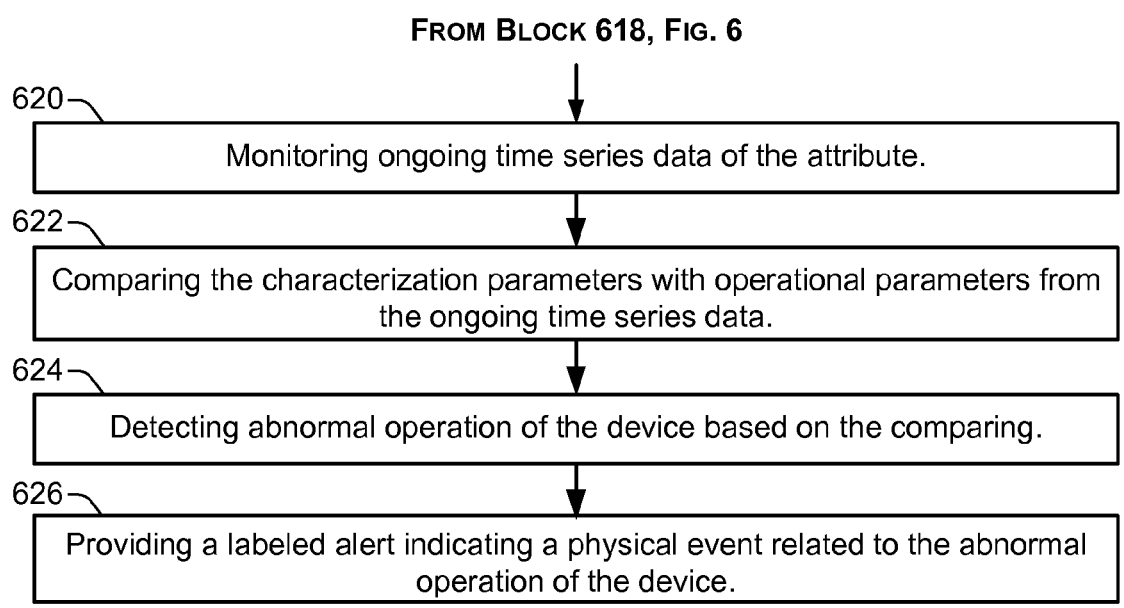

FIGS. 6 and 7 show a flowchart of an example method 600 of characterizing temporal behavior of a device, according to an embodiment of the disclosure. Method 600 is associated with the embodiments discussed above with respect to FIGS. 1-5. Method 600 begins at block 602, FIG. 6, with collecting time series data for an attribute of a device. Collecting the data can include, for example, sensing the power consumption of the device at a specific sampling rate. The method 600 continues at block 604 with pre-processing the time series data to, for example, remove invalid values, noise and outlying data values, and to fill in missing values in the data and make time intervals uniform between data samples (e.g., through linear interpolation). Where multiple time series are collected, pre-processing can include synchronizing the time series. At block 606 of method 600, edges in the time series data such as rising and falling edges are detected, which provides a time series of all deltas in successive time points of the sampled attribute. The method 600 continues at block 608, with arranging groups of similar edges into clusters, which includes determining a number of clusters (e.g., through domain information, silhouette coefficients, sum of squares), and clustering the groups with a clustering algorithm (e.g., K-means algorithm, k-medoids, hierarchical clustering, etc.).

At block 610 of method 600, a different number of clusters may be received from a domain expert supervisor, and the groups of similar edges may be arranged again into the different number of clusters, as shown at block 612. At block 614, label input is received from the supervisor, and at block 616 each cluster is labeled with a label as being associated with, or as corresponding with a physical event of the device based on the label input. At block 618, characterization parameters are estimated based on the clusters. The parameters characterize normal operation of the device. The estimating can include, for example, computing the parameters through a density estimation using a mixture model.

The method 600 continues at FIG. 7, block 620, with monitoring ongoing time series data of the attribute. At block 622, the characterization parameters are compared with operational parameters from the ongoing time series data, and abnormal operation of the device is detected based on the comparing, as shown at block 624. At block 626, a labeled alert is provided indicating a physical event that is related to the abnormal operation of the device.

What is claimed is:

1. A method of characterizing temporal behavior of a device, comprising:
   collecting time series data for an attribute of the device;
   pre-processing the time series data;
   detecting edges in the time series data;
   arranging groups of similar edges into clusters;
   receiving label input from a supervisor;
   labeling each cluster as being associated with a physical event of the device based on the label input;
   based on the clusters, estimating characterization parameters that characterize normal operation of the device.

2. A method as in claim 1, further comprising:
   monitoring ongoing time series data of the attribute;
   comparing the characterization parameters with operational parameters from the ongoing time series data;
   detecting abnormal operation of the device based on the comparing;
   providing a labeled alert indicating a physical event related to the abnormal operation of the device.

3. A method as in claim 1, wherein collecting time series data comprises sensing power consumption of the device at a specific sampling rate.

4. A method as in claim 1, wherein pre-processing the time series data comprises removing invalid values, filling in missing values, making time intervals uniform between data samples, filtering the data to remove noise and outlying data values.

5. A method as in claim 1, wherein detecting edges comprises detecting rising and falling edges of the time series data.

6. A method as in claim 1, wherein detecting edges provides a time series of all deltas in successive time points of the attribute.

7. A method as in claim 1, wherein arranging groups of similar edges into clusters comprises determining a number of clusters.

8. A method as in claim 1, wherein arranging groups of similar edges into clusters comprises clustering the groups with a clustering algorithm.

9. A method as in claim 8, wherein the clustering algorithm comprises a K-means algorithm.

10. A method as in claim 1, wherein estimating characterization parameters comprises computing the parameters through a density estimation using a mixture model.

11. A method of characterizing temporal behavior of a device, comprising:
    collecting time series data for an attribute of the device;
    detecting edges in the time series data;
    arranging groups of similar edges into a number of clusters;
    receiving a different number of clusters from a supervisor;
    arranging the groups of similar edges into the different number of clusters;
    labeling each cluster with a label received from the supervisor; and
    estimating characterization parameters from the clusters that characterize normal operation of the device.

12. A device characterization system comprising:
    a sensor to sense an attribute of a device;
    a processor;
    a semi-supervised, characterization algorithm executable on the processor to collect time series data of the attribute from the sensor, detect edges in the data, identify clusters from the edges, label the clusters based on input from a supervisor, and estimate device characterization parameters from the clusters.

13. A device characterization system as in claim 12, further comprising:
    a server that is remote from the device;
    wherein the device comprises the sensor, and the server comprises the processor and the characterization algorithm.

14. A device characterization system as in claim 12, wherein the device comprises the sensor, the processor, and the characterization algorithm.

15. A device characterization system as in claim 12, wherein the characterization algorithm comprises:
    a data collection module to collect the time series data;
    a data pre-processing module to eliminate noise and invalid values in the data, and to fill in missing values in the data;
    an edge detection module to detect the edges in the data;
    a clustering module to identify groups of similar edges and arrange the groups of similar edges into the clusters;
    a cluster labeling module to receive the input from the supervisor and to label each cluster as being associated with a physical event of the device based on the input; and
    a parameter estimation module to estimate the device characterization parameters.

16. A device characterization system as in claim 15, wherein the characterization algorithm further comprises an anomaly detection module to detect abnormal device behavior by comparing the device characterization parameters with operational parameters from ongoing time series data, and to provide an alert with a label indicating a physical event related to the abnormal device behavior.

* * * * *